Figure 1:
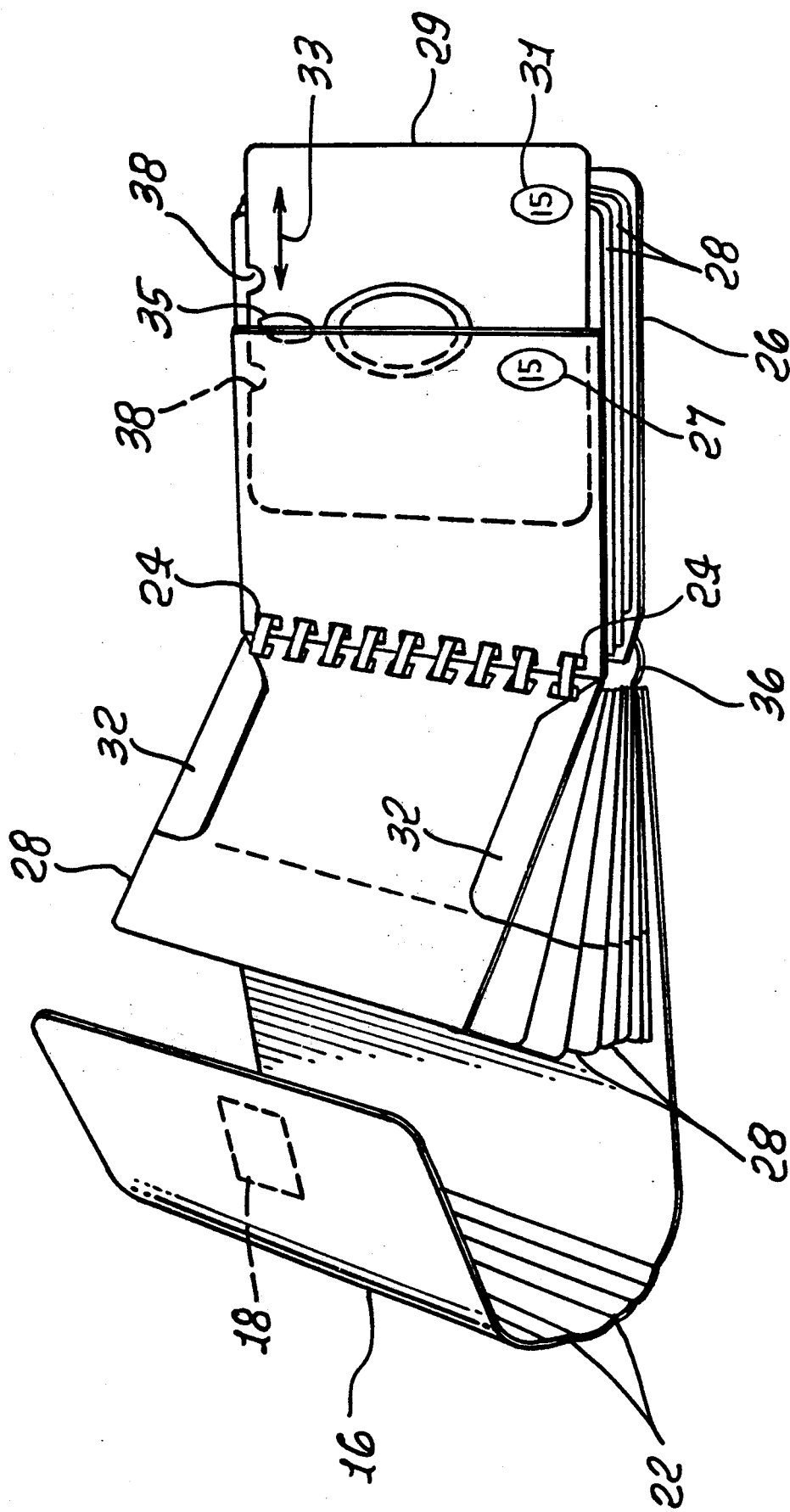

United States Patent [19]

Lievsay

[11] Patent Number: 5,193,681
[45] Date of Patent: Mar. 16, 1993

[54] BOOK-LIKE HOLDER AND ORGANIZER FOR SETS OF COMPUTER DISKETTES

[76] Inventor: Winslow R. Lievsay, 21795 Calatrava, Mission Viejo, Calif. 92692

[21] Appl. No.: 840,561

[22] Filed: Feb. 24, 1992

Related U.S. Application Data

[63] Continuation of Ser. No. 746,287, Aug. 13, 1991, abandoned, which is a continuation of Ser. No. 586,567, Sep. 21, 1990, abandoned.

[51] Int. Cl.$^5$ .............................................. B65D 85/30
[52] U.S. Cl. .................................... 206/444; 206/311; 206/425; 206/472
[58] Field of Search ................... 206/309–313, 206/425, 444, 472–474, 449, 450; 229/1.5 R

[56] References Cited

U.S. PATENT DOCUMENTS

| | | | |
|---|---|---|---|
| 251,273 | 7/1879 | Egly | D3/35 |
| 280,262 | 4/1885 | Egly | D3/35 |
| 287,069 | 4/1886 | Egly | D3/35 |
| 291,387 | 11/1887 | Egly | D3/35 |
| 293,335 | 1/1887 | Egly | D19/27 |
| 1,238,735 | 9/1917 | Barlow | 206/311 |
| 2,910,068 | 9/1959 | Lane | 129/1 |
| 4,225,038 | 3/1980 | Egly | 206/45.18 |
| 4,289,235 | 8/1981 | Egly | 206/387 |
| 4,369,879 | 11/1983 | Egly | 206/45.18 |
| 4,449,628 | 6/1984 | Egly | 206/45.18 |
| 4,508,366 | 2/1985 | Brindle | 281/36 |
| 4,588,321 | 4/1986 | Egly | 402/77 |
| 4,684,019 | 7/1987 | Egly | 206/309 |
| 4,730,727 | 3/1988 | Petroff | 206/311 |
| 4,762,225 | 8/1988 | Henkel | 206/311 |
| 4,778,047 | 10/1988 | Lay | 206/44 B |
| 4,793,477 | 1/1988 | Manning | 206/232 |
| 4,793,480 | 12/1988 | Gelardi | 206/312 |
| 4,823,950 | 4/1989 | Roze | 206/311 |
| 4,850,731 | 7/1989 | Youngs | 402/79 |
| 4,852,740 | 2/1989 | Sellar | 206/444 |

FOREIGN PATENT DOCUMENTS

| | | | |
|---|---|---|---|
| 584356 | 10/1958 | Italy | 206/311 |
| 8401544 | 12/1985 | Netherlands | 206/309 |
| 138637 | 2/1930 | Switzerland | 206/311 |
| 26340 | 11/1907 | United Kingdom | 206/311 |
| 207842 | 1/1924 | United Kingdom | 206/311 |
| 222000 | 9/1924 | United Kingdom | 206/311 |

OTHER PUBLICATIONS

Acco Diskette Album Product #50495-1982? Brochure Extract.
Barbara Chan MacWorld Magazine Holder Reviews Sep. & Apr. 1987.
Micro Store Disk-Book Brochures-1990.
R. J. Products Product Brochure for An Embodiment of the Claimed Invention Printed Sep. 1990.

Primary Examiner—Jimmy G. Foster
Assistant Examiner—Thomas P. Hilliard

[57] ABSTRACT

A novel fastenable book-like holder, organizer and storage device for a series of computer diskettes. A set of diskette envelopes (28) uniquely leaved together with pliant covers (26)(16) bound by a device such as a popular plastic comb binding (36), and fastened by a device such as a hook and loop fastener (20) so that the holder secures a set of computer floppy diskettes. The cover configuration includes an elongated flapped member (16) which can be scored (22) for easy folding around the end of the holder; which, upon closure, secures the contents, and the curve of which, when open, keeps contained diskettes from falling from the various leaves (28). The materials and design are chosen to deliver the holders' utility; and allow it to be easily and economically manufactured.

6 Claims, 6 Drawing Sheets

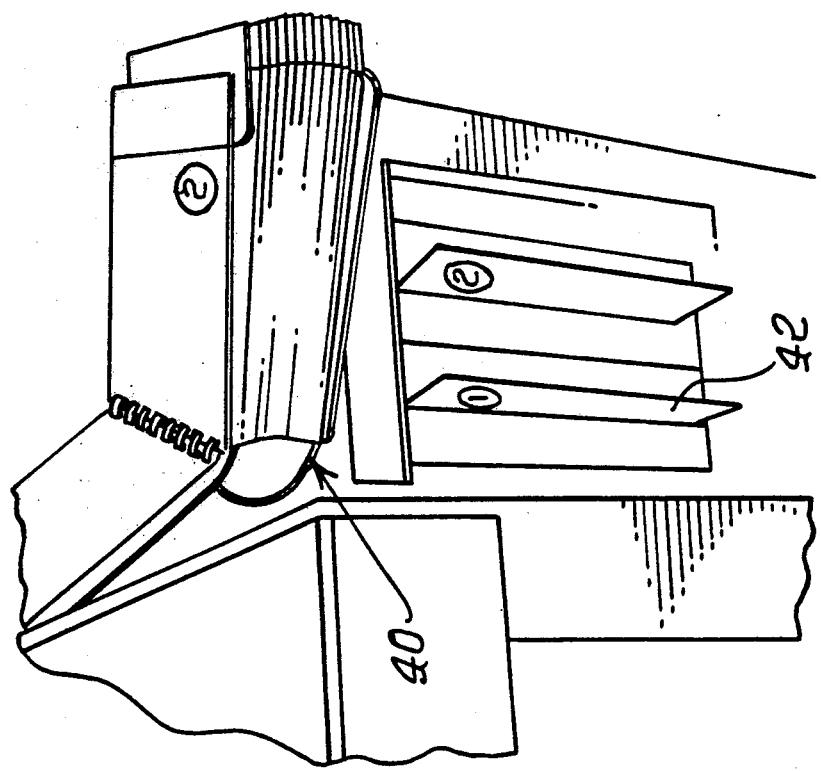
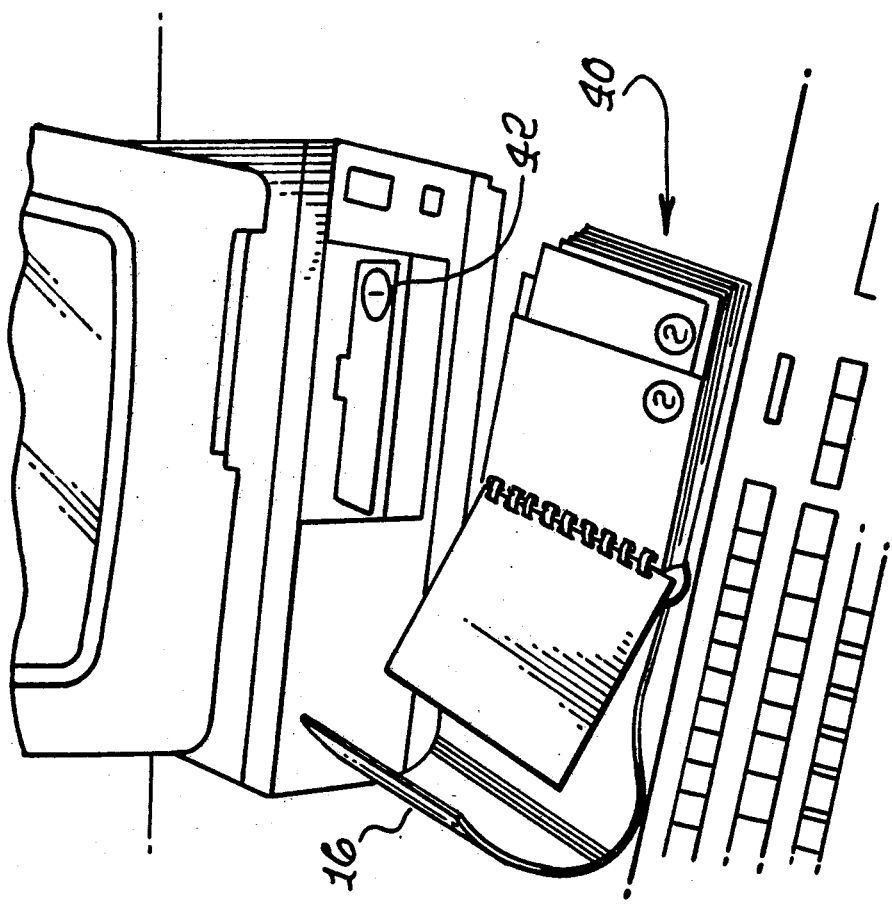

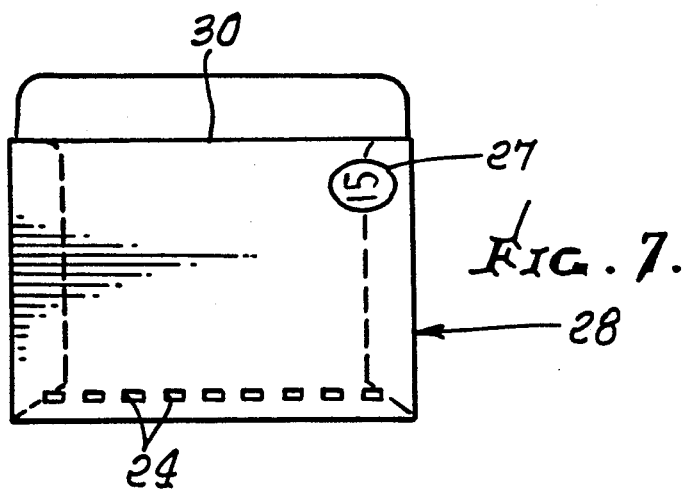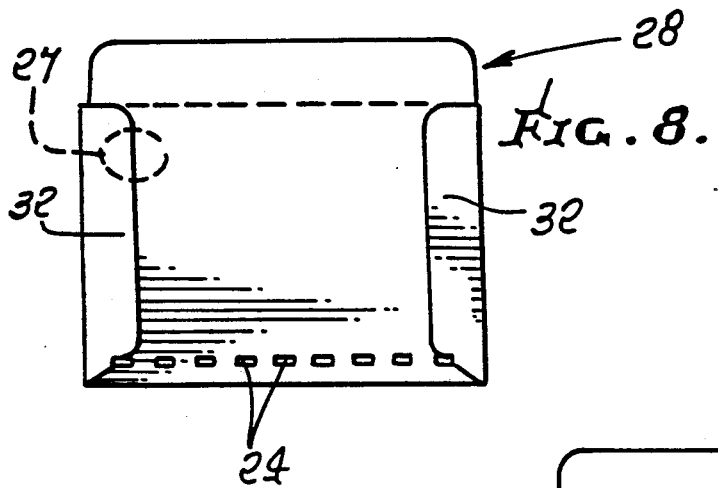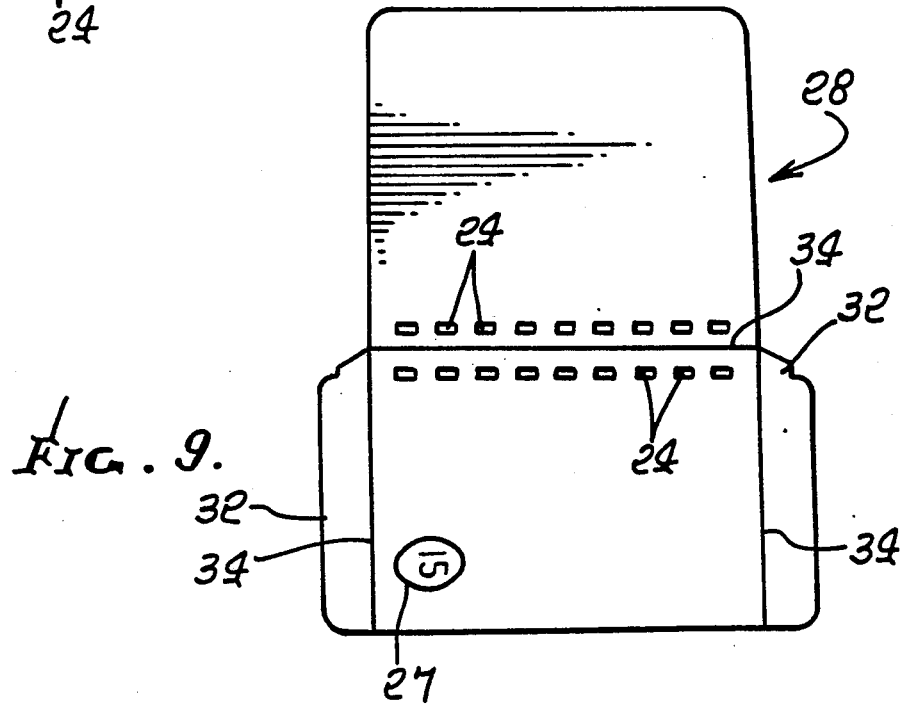

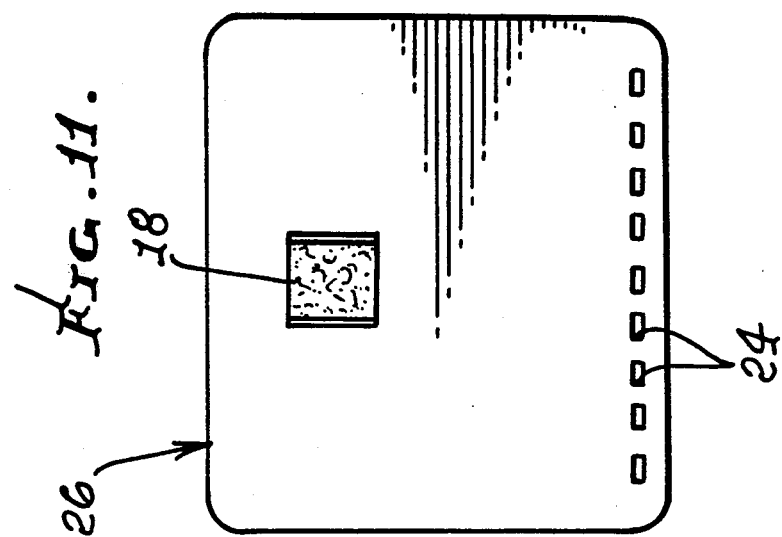
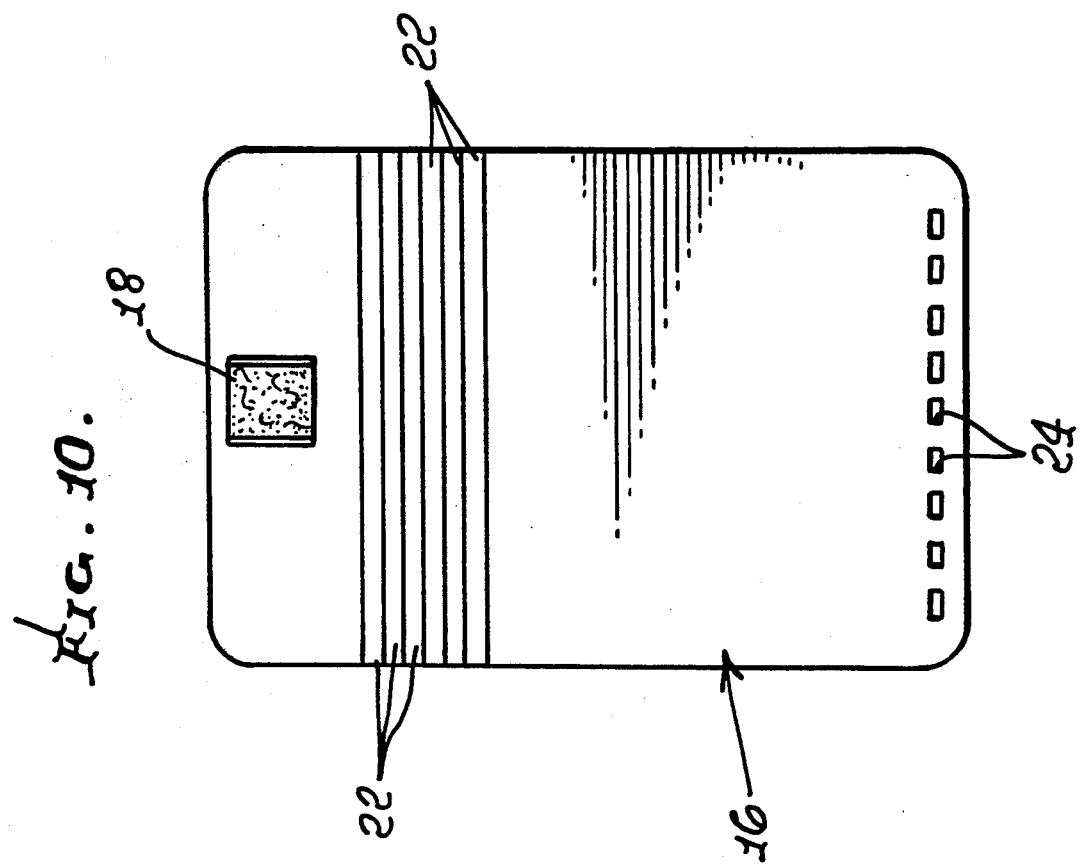

BOOK-LIKE HOLDER AND ORGANIZER FOR SETS OF COMPUTER DISKETTES

This is the second continuation of application Ser. No.: 07/586,567, now abandoned, Application Originally Filed: Sep. 21, 1990 which was subsequently continued as Ser. No. 07/746,287, now abandoned, by a filing on Aug. 13, 1991.

BACKGROUND-FIELD OF INVENTION

This invention relates to holders for magnetic media diskettes in the personal or desktop computer industry.

BACKGROUND-DESCRIPTION OF PRIOR ART

Various devices for the containment, storage and safekeeping of computer floppy diskettes exist in the prior art. The prior art holders are not designed for, do not facilitate, and have failed to recognize the unique requirements of sequential bulk diskette manipulations. The elimination of visual choices among multiple diskettes which are being sequentially accessed and the static positioning of each diskette in its sequence at the same grasping position are highly useful capabilities during these manipulations. The attainment of these capabilities is the main object of my claimed invention. To put it more simply, my claimed invention is functionally like a portable push-down/pop-up dish stacker for computer floppy diskettes with an additional capability of easy accessibility to dishes (diskettes) in the middle of the stack. These functions offer Henry Ford's assembly line types of efficiencies to bulk sequential diskette manipulations.

Within the personal and desktop computer industry various manipulations of diskettes are made. The prior art holders are designed to facilitate one or more of these manipulations while at the same time protect diskettes from trauma. In order to understand the uniqueness of my invention, it is helpful to classify the primary manipulations and assemblages of computer diskettes.

A. Bulk Assembly, Distribution, & Store Shelf Display

New blank work diskettes are assembled in sets by their manufacturer for bulk packaging, for transporting to wholesaler, for retailer store displays, and then for eventual unpacking by the end user for individual diskette utilization.

B. Assembly with Documentation for the Use of Their Contents

Diskettes containing program and/or data information are assembled together with written matter which explains how their data or programs are utilized, for distribution in bulk through the channels of A. for eventual program and/or data usage by an end user.

C. Individual Computer User Data and Program Archiving

Sets of diskettes are assembled at the computer workplace which contain programs and working data somewhere near the computer where individual diskette retrieval is required as the computer is used. Usually large numbers of diskettes are stored in this manner ready for a variety of tasks, but for any given task a small number of diskettes need to be manipulated. Word processing and spreadsheet calculations are these types of applications.

D. Individual Computer User Bulk Data Duplication for Safekeeping (aka. Backup) or Transmittal Here the computer task requires the transferral of millions of characters (bytes) of information from (or to) a high capacity computer storage device such as a hard disk to (or from) a large ordered sequential set of diskettes one at a time. The difference between this use and C. above is that not only must there be a large number of diskettes near the workspace, but repetitive uniform diskette handling of each of the diskettes of the set is required in its turn.

Since the distinction between the types of diskette handling required between C. and D. above is essential to understanding the novel and unobvious utility of my invention, I offer an analogy of a deck of cards to further distinguish the two. The diskette manipulations accomplished in C. above can be likened to fanfolding open a deck of cards and selecting one visually, say the Ace of Diamonds. One card is selected from a set of many. An example manipulation with a deck of cards similar to the diskette handling of D. above would be that which is done when cards are drawn or discarded in their turn from a horizontally placed deck on a table such as in Gin or Rummy. In this latter case, each of the cards in turn is selected from the same point in space for its manipulation.

The prior art diskette holders can be distinguished by considering which of these four (A.-D.) diskette manipulations they facilitate:

A prolific prior art author in this field is Egly et. al. (Des. 251,273 3/79, 280,262 8/85, 287,069 12/86, 291,387 8/87, and 293,335 12/87, U.S. Pat. Nos. 4,225,038 September 1980, 4,289,235 September 1981, 4,369,879 January 1983, 4,449,628 May 1984, 4,588,321 May 1986 and 4,684,019 August 1987). These are rigid boxes designed for type A. diskette assemblages. These types of holders in the words of Petroff U.S. Pat. No. 4,730,727 (Petroff-Mar. 15, 1988) Col 1 Line 51 "... all use a box type storage which adequately solves the shortcomings of the fragility of the cardboard box, but they do not offer adequate safeguard from diskette manipulation and are therefore also time inefficient. The box type of storage of diskettes does not resolve the problem of retrieval of a diskette from a file ... ".

The Petroff device is claimed to facilitate diskette manipulations required in type C. through a unique accordion assemblage encased in a rigid book-like outer shell. However, Petroff does not discuss, nor does his device facilitate repetitive uniform diskette manipulations of type D. uses. My claimed invention not only provides the Petroff capabilities, but also uniquely reduces the effort required for diskette manipulations of type D. (and in some cases type C.) uses. Two significant unique and new results of my invention are hands-free uniform "bookmarking" of one and only one diskette, and a dual purpose cover which secures the holders contents while both open and closed, I attain these results by replacing Petroff's accordion assemblage with a ring bound plurality of identical paper-like single floppy diskette sleeves which function like book pages. With this improvement, the device may lie open in a flat horizontal state at any given page spread displaying on the right hand page a small front panel as well as the label and gripping edge on any diskette which it contains handily near the fore-edge. At this same page spread the left hand page displays the back large panel of the previous page or cover, but does not display a labeled diskette to grasp. Accordingly, at any one page spread, there is one and only one diskette displayed for accessing. A further improvement is my substitution of two pliant form retentive covers attached to the ring binding in lieu of Petroff's five section rigid casing assembly. The cover material allows the long overlapping cover to be scored with grooves such that it will achieve and retain a curvature at one end. The Petroff cover cannot achieve and retain this curvature due to the weight and rigidity of his cover material. His grooves are useful only when the device is closed. Petroff's one piece rigid (non-pliant, non curvature retentive) cover is required in his specification for two reasons. Firstly, he states that the rigid section 32 is one of the three elements necessary to prevent the assemblage of envelopes from expanding too far. Secondly, the rigid section 32 is required to enable proper opening in a fan-like fashion. Petroff admits this in his discussion of U.S. Pat. No. 4,331,290 Benham May 5, 1982: Col 2 Line 67 ". . . the bottom of Benham's folder . . . is made of folding parts and is, therefor, not rigid; this would prevent the folder from opening in a fan-like fashion."

Petroff's invention is confined to his accordion assemblage. It cannot be opened more than approximately "6 degrees" for each envelope slot by his own admission. For a 10 diskette device, this would be 60 degrees. Petroff specifies that this open fan is the best way to access the holders contents because each envelope is held open. Yes, when one searches for one card in a Gin hand the fan display is efficient for inspection. But when one must sequentially access each card from a deck of cards with one hand (the other hand being busy), we all have found that laying the deck down horizontally and turning cards over one at a time is most efficient. Petroff writes-"In Wilburger, the structure is further weakened by the needed spare space to allow flipping." U.S. Pat. No. 1,499,712 (Wilburger Jul. 7, 1924) is a multiple envelope phonograph disk record album assembled with book-like pages. Petroff doesn't like the desk space utilized by such a device when lying horizontally flat with pages open. Moreover, Petroff teaches against unnecessary flipping of diskettes. He considers flipping to be inefficient and to create an unnecessary risk of damage to the diskette. Therefore, Petroff by teaching of his advantages of the small desk foot print over Wilburger and by preferring 'fanning' to 'flipping,' confines himself to his accordion assemblage and its limited utility. Petroff thereby teaches against page leaves.

Notwithstanding Petroff, my individual ring bound diskette envelope leaves provide a unique assistance to one involved with a diskette manipulation like D. above. When used with an operation of type D., my invention frees both hands to load diskettes into the computer and to operate it. When my invention is opened to a spread, it remains there with the right hand leaf displaying its paper-like planar surface and the label on any presently contained diskette. One and only one diskette is displayed showing its label and offering up a safe full gripping edge conveniently near the fore-edge. Very importantly, my holder also presents each diskette uniformly at the same right hand page location. This is hands-free uniform locational "bookmarking". My holder does not present two diskettes, one at the top of the leaf and one at the bottom. Nor does my holder present two diskettes, one on the left hand page and one on the right hand page. To understand why this function is important, consider the analogy of the deck of cards. Assume that there are two stacks of cards to draw from. Which should you choose? The elimination of visual choices among multiple items which are being sequentially accessed and the static positioning of each such item in its sequence at the same grasping position are significant efficiencies. These are the main objects of my invention. The need for these efficiencies in computer diskette holders has not been recognized by the prior art.

Take for example U.S. Pat. No. 4,508,366 (Brindle-Apr. 2, 1985). Brindle has ring bound page leaves. Brindle was designed for the facilitation of type B diskette assemblages. (As was Egly's Box U.S. Pat. No. 4,588,321 May 5, 1986). But Brindle has left and right diskettes on alternating pages. Brindle teaches that two diskettes per page (one on the top and one on the bottom) will prevent undesirable "bunching". In so doing, he is not recognizing the utility of single diskette presentation at each page spread. Brindle therefor has not recognized my unique hands-free uniform locational "bookmarking" of one and only one diskette.

A search of prior art in the U.S. Class/Subclass 206/309, 311, 312, and 313 will uncover old phonograph record album devices such as British patents #26,340 (1907) and #209,842 (1922). Petroff has distinguished the limitations of these devices. His comments are equally applicable to my holder. These holders are not well suited for computer floppy diskette manipulation or containment. Although computer floppy diskettes are called "diskettes" they are universally encased in square jackets. They are not labeled nor grasped the same as phonograph records. The phonograph albums do not allow the labeling area of floppy diskettes to be viewed or grasped for removal. Their envelope openings require that two hands be used for diskette insertion. The speeds of the old phonographs made it unnecessary for one handed rapid manipulation of records. The need for this was not recognized. Square computer floppy diskette's have fragile areas of media exposure, namely: read-write windows, and index and spindle holes. The phonograph record album leaves with their center punchouts would endanger the computer floppy diskette's fragile index and spindle hole media exposures. Functionally, these devices do not offer my holder's hands-free uniform locational "bookmarking" because they display albums on both the left and right hand pages and do not display the labels of floppy diskette assemblies.

British patent #209,842 shows a cover which overlaps the outward edges of its contents for securing its contents when closed, however this functionality is singular in nature. It provides no similar protection while the device is open and in use as does my dual purpose cover.

U.S. Pat. No. 4,778,047 (Lay-Oct. 18, 1988) shows a plurality of disk envelopes designed for the containment of laser disks. Each disk envelope has a wall affixed to a spring appendage rigidly affixed to protective shell members. The device's envelope walls by design would need to be comprised of highly resilient (and hardly paper-like) rigid materials in order to be securable to the spring member appendages. The rigidity of the wall material, while acceptable for laser disks, is not suitable for containment of naked computer floppy assemblies. My holder's paper-like leaves allow exposed media portions of the fragile naked floppy assemblies to be properly protected. In order to use the Lay holder with computer floppy diskettes individual protective paper sleeves would need to be used before loading a diskette into the device. Lay also prefers an embodiment with envelopes on both sides of the intermediate page leaves. In so preferring, he fails to recognize the value of single diskette bookmarking. But lay is forced into providing duplicate slots on each leaf in order to save space and weight. A Lay device with one diskette per leaf would be uneconomical to manufacture, and excessively heavy and bulky. By selecting ring bound paper-like leaf materials not only have I avoided Lay's weight, bulk, manufacturing cost, but I have added hands-free uniform single diskette locational "bookmarking". By designing his envelopes with arcuate slot openings, Lay makes his device clumsy to load with square computer floppy jackets. Care must be taken to insert each of a computer floppy diskette's bottom jacket corners into the leave's arcuate slot. With my envelope design, its non-arcuate small panel fore-edge opening guides the balance of the bottom jacket edge properly after only one bottom edge jacket corner has been inserted.

An unpatented device which combines a British patent #209,842, or Petroff-like overlapping cover with Lay-like leaves designed for floppy diskettes was made by Acco ® (Refer to the parent application Information Disclosure Statement mailed October 1990). This is a discontinued product #50495 by the Acco World (aka. Acco International Inc. 770 S. Acco Plaza, Wheeling, Ill., 60090 (800) 222-6462. The binding system used by Acco ® is an axle and channel mechanism (as opposed to Lay's spring appendages) which Acco ® has successfully utilized with its microfiche holding equipment. The page envelopes of necessity (Like Lay) were fabricated from stiff resilient plastic material. This made it necessary to jacket the diskettes in protective paper envelopes before insertion into the leaves. Thus the accessing of each diskette required the additional step of individual paper envelope removal. Another Acco ® problem was that the size of each envelope necessitated one's prying open the leaf in order to see the label. Any sequential labelling scheme was made difficult. Labels were needed for the plastic pages, the envelopes and the diskettes. The Acco ® device, due to its axle and channel hinges, did not allow its pages to remain flat when opened. The Acco ® page leaves could only pivot through an angle of 105 degrees. Acco ® (of necessity like Lay) had the individual leaves designed to hold diskettes on each side of the leaf. This again is the failure to recognize the convenience of single diskette uniform locational display and access for each page spread. But the bulk, and weight of the chosen binding mechanism forced a double leaf loading like the Lay device. Acco ®'s extra diskette paper covers, large diskette covering slots, verso and recto diskette accessing, made it the clumsiest of all the above holders to use for bulk diskette sequential manipulations of type D. above. This is quite surprising in that Acco ® combined more relevant prior art features than anyone until my claimed invention. This tends to prove the complexity of such combinations and unobvious nature of my claimed invention's combinatory results. In any event, the failure of Acco ® to facilitate bulk sequential diskette manipulations, indicates once again a failure to recognize the unique needs thereof.

In order to further distinguish the limitations of the prior art holders, consider the detailed steps of a type D. computer bulk computer sequential diskette manipulation such as a floppy diskette backup procedure:

(a) A large number of diskettes are assembled in a work area adjacent to a computer (for a complete hard disk copy typically 10–40 but often more)

(b) The diskettes are ordered and labeled usually numerically 1,2 . . . etc.

(c) The computer is loaded with its first diskette(s) to begin receiving data.

(d) As a diskette receives the data the computer operator waits idly for the computer's signal for the next diskette.

(e) When the computer has filled a diskette with data, it signals the operator to unload the diskette and insert the next sequential diskette for additional data receipt. At this step the operator is now very busy, quickly unloading the previous volume, locating and inserting the next diskette and filing the unloaded volume.

(f) Steps (d) and (e) are repeated for 10–40 or more times, until all the required hard disk data is transferred to the diskettes. These repetitive steps are highly error prone. This is because of the succession of periods of 'hurrying up' when reloading new diskettes and then 'waiting' as the floppy diskettes are filled. The computer operator's attention span can easily wander. This wandering is often by design as the operator attempt's to accomplish other unrelated work while he is idle during diskette data transferral periods. These wandering attention periods frequently cause mistakes in procedure, miss-labeling of diskettes, and many times one must repeat the whole process in order to correct the error made. The complete copying process can take a lot of time. As a result, interruptions are bound to occur. The operator needs a static hands-free method to determine the exact point of resumption after any interruption.

(g) When all data is transferred, the set of diskettes is packaged, labeled then relocated or stored away from desktop space near the computer.

My invention's capabilities are incomparable to those of Brindle, Petroff, Lay, Acco ®, and the old phonograph albums in their ability to accomplish steps (a) through (g) above.

My holder embodied in FIG. 1A and FIG. 1B rests and displays each of its diskettes at precisely the same spacial location conveniently and compactly in two typical computer work arrangements. Brindle requires additional work for the loading of each diskette. Refer to FIG. 1 and note that the exposed media portion of the example computer diskette 35 is arranged to be at the top of the page. The right hand may grasp each diskette contained thusly in my invention at exactly the same location, then unload it with a simple movement to the right 33. Then, a simple direct movement (with no diskette rotation of any kind) towards the computer, positions a diskette for loading. Brindle's leaf arrangements require that a horizontal diskette rotation of 180 degrees be made for each diskette loading and again for unloading. The clever Brindle user might turn the holder upside down but then the label's would have to be read upside down, which is avoided with my holder. Brindle displays two and perhaps as many as four diskettes at any one opening of the leaves. A user might have to inconsistently select, verso top, verso bottom, recto top, then recto bottom as he accesses each of four displayed diskettes. An interruption, in the accessing would leave the point of resumption in question. With Brindle, the different diskette spacial locations make repetitive diskette accessing slower and more complex. My holder prevents this eventuality, by resting at the point of display of one and only one diskette.

Petroff's holder requires that both hands be used to manipulate the holder for each diskette loading or unloading. In these type D. procedures, an operator must use both hands for unloading and loading diskettes into the computer slots many times as well as manipulate the computer keyboard (or mouse). Petroff's two handed slot location requirement is an overwhelming deficiency in procedures of type D. above. During a type D. procedure a user of Petroff's device can more quickly unload all of the diskettes, stack them up, and manipulate them from one stack to another and then finally reload his holder. This type of envelope-free diskette manipulation risks trauma which both Petroff and I want to avoid.

Lay's device requires that each diskette be protected with an additional separate envelop like Acco ®. Lay also prefers an embodiment with envelopes on both sides of the intermediate page leaves. He also fails to recognize the value of single diskette bookmarking. Lay's arcuate slot openings are inefficient for insertion and secure containment of square diskette assembles and would require two handed operation.

With Acco ® each diskette needs to be identified by prying open the stiff plastic envelope material then removing the paper envelope. This is obviously a two handed process which completely negates its otherwise useful pivoting leaf design during a type D. diskette manipulation. Acco ®'s individual leaves hold diskettes on each side of the leaf. This again is the failure to recognize the convenience of single diskette uniform locational display and access for each page opening. A user must alternatively select the left page then the right page during a sequential diskette manipulation. This again hinders proper sequential resumptions of the repetitive process when interruptions occur. The use of the Acco ® holder for the accomplishment of a sequential diskette manipulation of type D. would require more time and effort than any of the diskette holders herein considered.

British patents #26,340 & #209,842 require two handed selection of each leaf during their operation for two reasons. The page must separated from other leaves then the leaf must be opened in order to identify and remove the diskette. This excessive manipulation for each diskette is negates the benefit of the holder's offering up diskettes in a convenient position. Furthermore, they are unable to mark their places at one diskette's location while at one page spread. This inability to assist with the proper sequential resumption by an interrupted user limits their utility in type D uses. #209,842 further inhibits efficient sequential "bookmarking" by having two slots per page and a binding mechanism unable to display a particular page spread without being hand held.

One can readily see that my invention uniquely reduces the human effort required during a bulk data transfer process. This is due to its unique capabilities unrecognized in the prior art. My invention allows a sequential set of diskettes to be set up near a computer in a work space uniquely efficient to the accomplishment of bulk data transfers as shown in FIGS. 1A and 1B. In its work space, my invention allows each of the sequential set of diskettes in its turn to be accessed by one hand. My invention allows manipulation of each of a series of diskettes without having to rotate them into alignment with a computer's diskette loading aperture.

Figure 3:
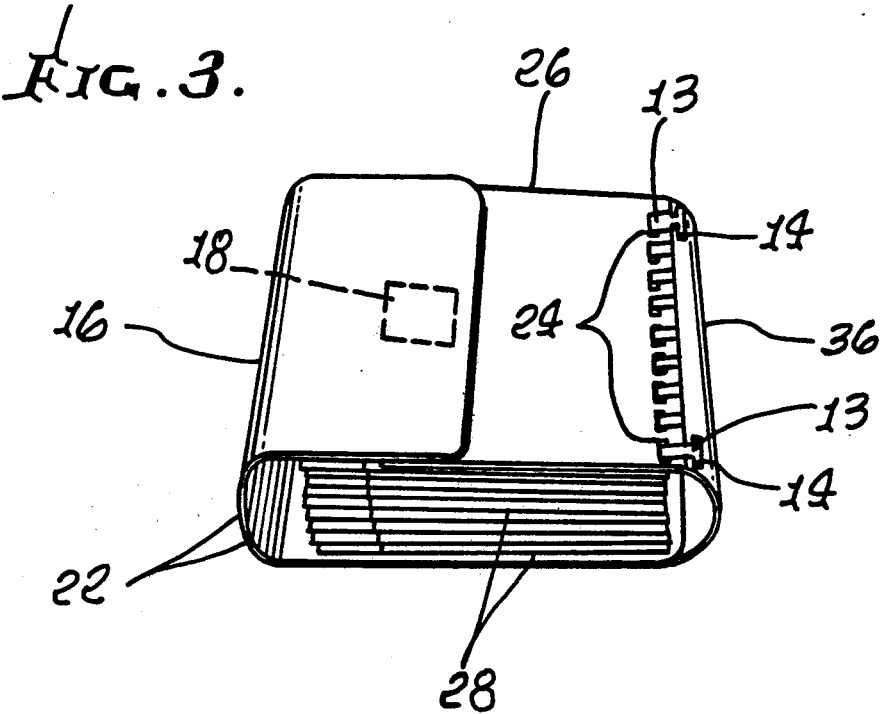

My invention allows its storage leaves and diskettes to have readily viewable identifying labels for one and only one diskette at a time so that a user who is interrupted (or whose mind wanders) can easily find the proper place to resume. In distinction from other latchable holders, my invention protects its contents from falling out with its curved long cover 16 while open (FIG. 1 and 1A.) in use and also while closed for storage (FIG. 3.). My invention's superior ease of use greatly speeds the bulk data transferral process through elimination of many unnecessary human motions, hesitations, and mistakes in bulk sequential diskette manipulations.

OBJECTS AND ADVANTAGES

My invention is designed to facilitate the manipulation and storage of series of computer diskettes created by activities such as regular back ups or off-loads. Several advantages of my invention over the prior art are:

(a) The book-like operation in its compact size allows the device to be statically stationed (without being handheld) at a single diskette's horizontal page spread on a ledge or work area near the computer floppy diskette loading slots. Once stationed in such an unheld manner, each of a sequential set of diskettes may be located and removed (or stored) at the same spacial location with only one hand with efficient identical storing (or removing) motions.

(b) Diskettes and/or their respective leaf envelopes can be labelled uniquely so that an individual horizontal page spread will display only one identifiable diskette or page at a time.

(c) Leaves may be comprised of standard floppy diskette paper protection envelopes in use throughout the industry. This keeps cost, weight, and size to a minimum. Bare diskettes need no other cover than the leaves of the device for protection. Moreover this simple envelope design is a classic in its efficiency for protection and handling.

The novel assembly of prior art allows its efficient fabrication using known manufacturing methods of a variety of heretofore uncombined prior art processes.

DRAWING FIGURES

FIG. 1: is a perspective view of one embodiment of a holder according to the invention in an open position.

FIG. 1A: is a perspective view of one embodiment of the holder shown prepared to accomplish its function near the floppy diskette aperture of a desktop computer.

FIG. 1B: is a perspective view of one embodiment of the holder shown prepared to accomplish its function near the floppy diskette aperture of a deskside tower or side platformed computer.

Figure 2:
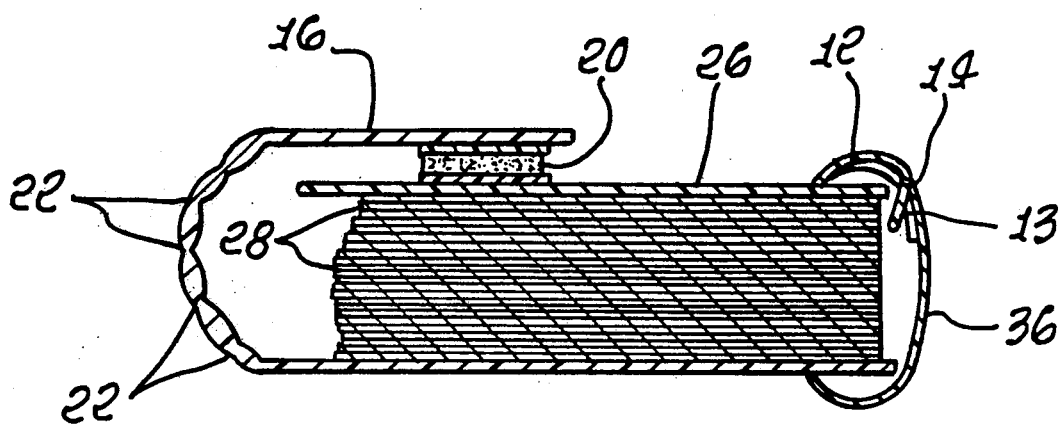

FIG. 2: is a side view of a second embodiment of the invention in a closed position.

FIG. 3: is a perspective view of FIG. 1 in a closed position.

Figure 4:
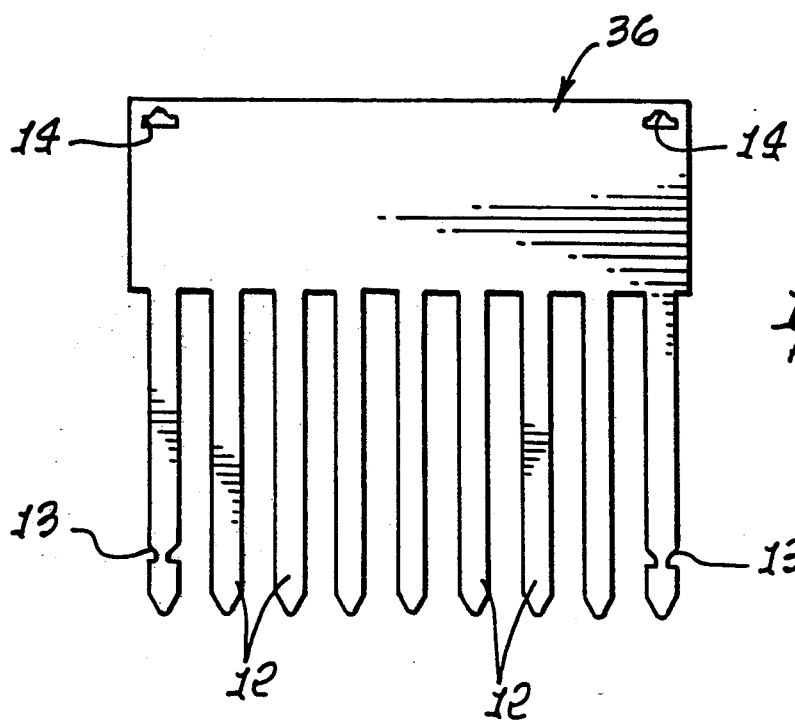

FIG. 4: is a flattened out view of a binding comb component formed according to the principles of the invention.

Figure 5:
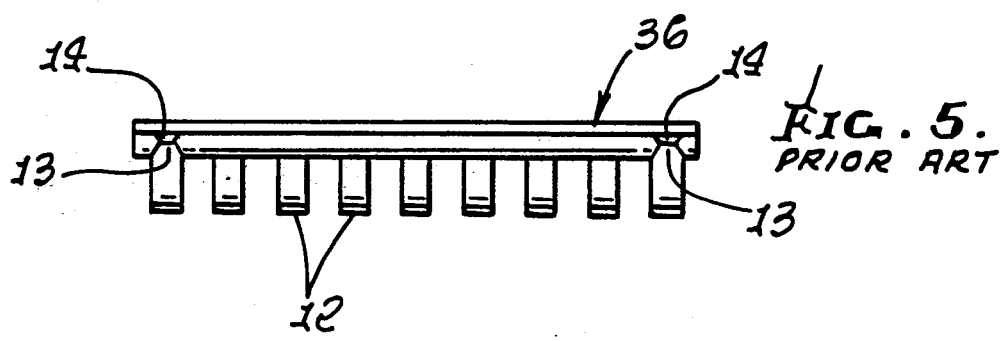

FIG. 5: is a side view of the component resulting from FIG. 4 when prepared for assembly with one embodiment of the invention.

Figure 6:
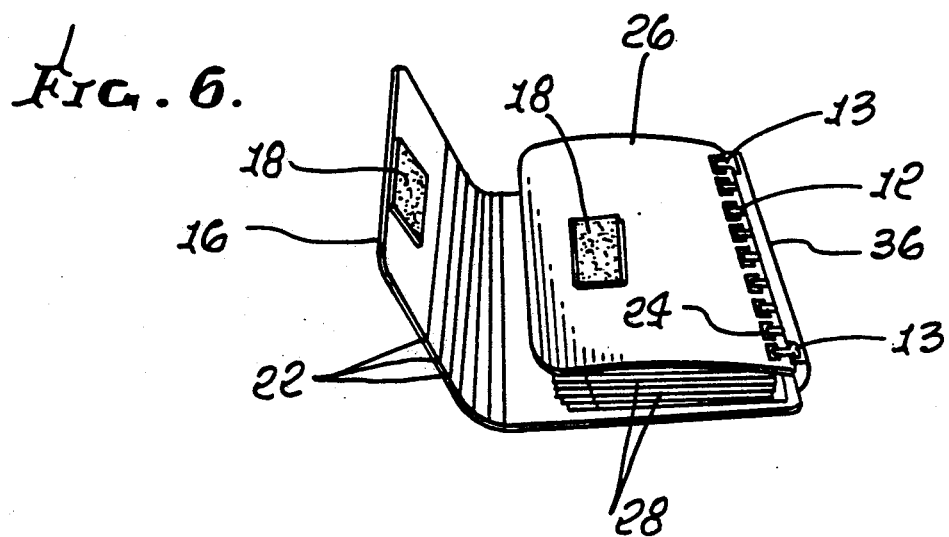

FIG. 6: is a perspective view of FIG. 1 in a semi-closed position.

FIG. 7: is a front panel view of one of the finished envelope leaves in accordance with the invention.

FIG. 8: is a back panel view of one of the finished envelope leaves in accordance with the invention.

FIG. 9: is a view of an unfinished envelope leaf to be constructed in accordance with the principles of the invention before folding and gluing into its finished form.

FIG. 10: is the inside view of a large overlapping cover component constructed in accordance with the principles of the invention.

FIG. 11: is the outside view of the small protective cover component constructed in accordance with the principles of the invention.

REFERENCE NUMERALS IN DRAWINGS

12: Normal binding comb loop finger
13: Locking binding comb loop finger
14: Aperture for securing locking loop finger
15: Diskette or leaf number label
16: Large protective overlapping cover
18: Hook or loop fastening strip
20: Hook and loop fastened combination
22: Score lines or grooves
24: Openings for engaging binder finger rings
26: Small protective flat cover
27: Sequential envelope label
28: A gathering of leaf envelope pages for floppy diskettes
29: Computer floppy diskette assembly
30: Front panel fore-edge opening for diskette insertion
31: Identification label on diskette label panel
32: Overlapping glue flap
33: Arrow showing diskette insertion/removal paths
34: Fold line
35: Diskette read/write media exposure
36: Plastic comb binding device (spine)
38: Diskette loading alignment notches
40: A complete holder assembly

DESCRIPTION-FIGS. 1 TO 11

Looking at FIG. 1, FIG. 2, FIG. 3 and FIG. 6 one can see a holder with a large cover 16 bearing grooves or score lines 22 towards its curved end and having attached and centered on its interior side of the cover towards its end flap, a hook or loop fastener 18. The cover 16 is scored near its flap end with a plurality of grooves 22 across its width such that the flap may be more easily folded allowing engagement of fastening mechanism 18. The other end of the cover is bound to a plastic comb spine 36 forming the holder's (ringbound) inside margin. This spine 36 also binds in a manner described by U.S. Pat. No. 2,910,068 (W. N. Lane-Oct. 27, 1959) a plurality of envelope leaves 28 between the large cover 16 and a small cover 26 such that the fore-edge small front panel openings 30 of each leaf are oriented away from the holder's inside margin and are accessible only on each recto page. The longer back panel of each leaf has its fore-edge oriented away from the holder's inside margin. Consistent with bookbinding terminology, Applicant refers to the front endleaf as the first envelop accessed as the holder is leafed through turning recto pages to verso pages. Similarly, the back endleaf is the term used for the last such envelope leaf turned during the leafing process. Also as with books, the fore-edges are termed herein as the edges oriented away from the spine. Any plurality of page leaves may be called a gathering 28 of page leaves. The comb plastic binder 36 has multiple embodiments of varying diameters and widths to accommodate holders designed for different numbers and sizes of diskettes for differing quantities of diskettes. The binder 36 includes one and preferably two locking mechanisms 13 and 14 at outside binding fingers discussed and portrayed in U.S. Pat. No. 2,920,068 (W. N. Lane-Oct. 27, 1959). Centered and attached to the outside of the small cover 26 as seen in FIG. 6 and FIG. 11 is a hook or loop fastener 18 which is complementary in function and location to its companion fastener 18 on the large cover 16. The cover material of 16 and 26 shown in FIG. 10 and FIG. 11 is a polyethylene ca. 0.023 gauge sheet plastic material equivalent or similar to Polyblend TM available through Polyblend Corporation St. Charles, Ill. or CRAWFORD TM by Crawford Industries. The material of the spine 36 is a plastic as is commonly found in the marketplace supplied by Ibico AG, General Binding Corporation (Northbrook, Ill.), or Tahsin or a close equivalent. The hook and loop fastening devices 18 and 20 are those commonly in use, and are attached utilizing a good grade of commercial permanent adhesive compound. The location and sizes of the holes 24 of the covers 16 and 26 and the envelope pages 28 conform to the specifications of the de facto standard current plastic binding combs in common use (refer to Ibico AG, General Binding Corporation (Northbrook, Ill.), Tahsin, et. al.). The page leaves 28 are made of a foldable material such as paper or a spunbound olefin (such material being available from DuPont under their tradename "Tyvek") material. These leaves 28 are cut from sheets to a form of FIG. 9, then folding along lines 34 with flaps 32 glued to their position of FIG. 8. The longest fold 34 separates the longer front panel from the shorter rear panel of each leaf and comprises the inside margin of each leaf. In FIGS. 1, 7, 8, 9 the lable 27 (15) is applied to each envelope's front panel to indicate its sequential page number. A companion set of sequential labels 31 in FIG. 1 is created by the user or supplied with the device. In this embodiment, the labels 27 and 31 are shown as preprinted numerical round permanent adhesive stick on labels.

OPERATION-FIGS. 1, 3, 6

Referring to FIG. 3 one can see the holder in a securely closed position and it is from this state that its use or operation will normally begin. The user of the holder will normally grasp the plastic binding end 36 by the right hand holding the device such that the large cover overlap is exposed at the top. The left hand thumb opens up the holder by peeling back to the left the flap of 16 causing disengagement of its hook and loop fastener 18 from its fastened state 20. At this point, the holder appears as is depicted in FIG. 6. The user now grasping the large cover 16 in his left hand, opens the back cover 26 and the envelope leaves 28 to the right making the device appear as is depicted in FIG. 1. At this time, a convenient ledge which is slightly wider than the back cover 26 and approximately as deep as the width of the device is located as close to the computer floppy diskette loading entrances as is possible (See FIGS. 1A and 1B). The size of this ledge need be only slightly larger than the size of a floppy diskette. The holder's need of such a compact work area which can be conveniently located near a computer is one of its prime novel utilitarian aspects. The holder is now placed on the working ledge space as is described above such that a small portion of the large cover 16, the spine 36, and a large portion of the small cover 26 rest on the ledge with the envelope leaves 28 exposed to the top. The operator may then easily turn the envelope leaves 28 like the pages of a book to access any particular envelope. Normally, when first put to use, all of the envelope leaves 28 will be turned to the right with the top (sequentially labeled "1" or "A" etc.) leaf 28 exposing its diskette insertion sleeve 30 upright ready for loading or unloading a diskette. The user is now uniquely well prepared to manipulate a sequential set of floppy diskettes utilizing the holder prepared in the manner outlined above. The first of the set of diskettes is inserted into the computer's floppy diskette drive 42 (FIGS. 1A and 1B) to be fully recorded with (in the alternative to fully transfer into the computer) the first part of the data being backed up (or off-loaded or restored). When the computer signals completion of this function, the operator of the holder removes the floppy diskette, inserts it into the sleeve 30 of the top envelope leaf 28 with the easy motion 33, then turns this leaf over as one would a page, secures the next sequential diskette and inserts it in its turn into the computer floppy diskette drive. This process is repeated until the computer signals that the full set of data has been transferred. At this time, the last diskette is removed from the computer floppy diskette drive and stored in its proper sequential envelope leaf 28. The holder is then closed reversing the steps outlined above for its opening and setup. While grasping the large cover 16 in the left hand, the user's right hand folds the envelope leaves 28 and the back cover 26 to the left achieving a configuration as is depicted in FIG. 6. Now grasping the holder with the right hand at the plastic comb binder 36, the user's left hand can fold the end flap of the large cover 16 over. The user presses the hook and loop fasteners 18 together accomplishing the fastening 20 FIG. 2. The device again appears as is depicted in FIG. 3. The operation of the large cover 16 is unique, simple and efficient. It 16 is designed longer than the device to allow its end flap to fold over the open ends of the envelope leaves 28 when they are empty, full, or partially loaded with floppy diskettes. In each case, the flexibility of the material, the varying degrees of foldability because of the scores 22, and the ability of the hook and loop fastener to only partially overlap but still strongly engage; allow the holder to snugly secure its contents.

SUMMARY, RAMIFICATIONS, AND SCOPE

The reader can now see that the computer floppy diskette holders of this invention are uniquely well suited for a particular method of storage and retrieval of the diskettes. These holders provide a computer user with an uncommon device which allows him or her to return to an interrupted backup or off-load easily determining the proper place for resumption. These holders allow a user to assemble a large number of diskettes for manipulation within an absolutely minimum amount of work area. When open and in use, the elongated cover member curvature helps to secure a set of diskettes in their proper envelopes. Additionally these holders are a novel combination of assorted useful tried and tested devices. Moreover, these holders are comprised of materials which: exhibit durability, readily submit to the processes of fabrication, are available from many suppliers, are in common use, and therefore can be economically obtained. The simplicity of operation of the holders makes their productive use possible with no particular special user training. The binding technique is widely used with small business offices making it easy for a user to repair or augment a holder. The properly closed holder can be dropped, or slung against a wall with no trauma sustained to it or its contents. These book-like holders fit in briefcases, on small ledges, in purses, and other storage areas most efficiently due to their compact size and pliant lightweight construction.

Although the description above contains many specificities, these should not be construed as limiting the scope of the invention but as merely providing illustrations of some of the presently preferred embodiments of this invention. For example: the cover material may be leatherette for a stylish executive version; the covers, leaves, and binders may be significantly wider or narrower to accommodate the varying sizes of computer floppy diskettes in use from time to time; the number of envelopes may be few or many depending on the relative amounts of data to be transferred and the storage capacity of the individual diskette; the envelopes and diskettes may be jointly packaged in a prenumbered (1,2,3, ... n) set to reduce labelling required by users; the cover material may have more or fewer scores depending upon the thickness of the holder's embodiment.

Thus, the scope of the invention should be determined by the appended claims and their legal equivalents, rather than by the examples given.

I claim:

1. A computer diskette holder holding a plurality of diskettes, comprising:
   a binding means;
   a plurality of identical diskette receiving envelopes, each containing only a single one of said diskettes, each diskette having a label and an edge, each envelope including:
      a front panel and a rear panel joined together except for a single peripheral opening at one side, said front panel being shorter than said rear panel such that said opening exposes said label and edge of a respective diskette, a bound edge margin of each envelope located opposite said opening being bound loosely by said binding means such that the envelope may rotate about said binding means, and such that one of said envelopes is immediately next in rotation to another of said envelopes, and said one and another envelopes may be positioned in opposite directions in generally a same plane;
   said plurality of envelopes being oriented such that their front panels face in a same direction of rotation about said binding means while being identically aligned along said binding means, whereby said one envelope may be filled and rotated and said another envelope is most readily apparent to be the next envelope subsequently filled to avoid confusion during selective sequential filling of said diskettes in said envelopes;
   a front cover sheet, a back cover sheet being shorter than said front cover sheet, said cover sheets being attached to said binding means and being adapted together to close said holder.

2. The holder holding the plurality of diskettes as set forth in claim 1, wherein said binding means comprises a binder made of resilient material, said binder having a spine and a plurality of fingers extending from one longitudinal edge of said spine, each finger having a curled body portion such that ends of said fingers engage a longitudinal edge of said spine opposite said one longitudinal edge, each finger extending through aligned perforations in said envelopes.

3. The holder holding the plurality of diskettes as set forth in claim 1, wherein the cover sheets include means for fastening them together, said fastening means including hook and loop fastening components, one of said components attached to an inside surface of the front cover sheet and the other component being attached to the outside surface of the rear cover sheet.

4. The holder holding the plurality of diskettes as set forth in claim 1, wherein the envelopes are uniquely labelled on the front panels.

5. The holder holding the plurality of diskettes as set forth in claim 1, additionally comprising flexing means which allow the front cover to assume a form fitting curvature around edges adjacent the openings of the envelopes when the holder is closed.

6. The holder holding the plurality of diskettes as set forth in claim 1, additionally comprising flexing means which allow the front cover to assume a form fitting curvature around edges adjacent the openings of the envelopes when the holder is closed and also retain its curvature when open whereby a verso envelope gathering of the diskettes is restrained from spilling out while the holder is open an in use.

* * * * *